United States Patent [19]

Adam et al.

[11] 4,420,703
[45] Dec. 13, 1983

[54] PERMANENT MAGNET MOTOR DRIVEN WINDOW LIFTER

[75] Inventors: Peter Adam, Höchberg; Werner Seuffert, Bergrheinfeld; Abdul R. Saeed, Würzburg, all of Fed. Rep. of Germany

[73] Assignee: Siemens Aktiengesellschaft, Berlin and Munich, Fed. Rep. of Germany

[21] Appl. No.: 400,989

[22] Filed: Jul. 23, 1982

Related U.S. Application Data

[63] Continuation of Ser. No. 144,572, Apr. 28, 1980, which is a continuation of Ser. No. 964,634, Nov. 11, 1978.

[30] Foreign Application Priority Data

Dec. 19, 1977 [DE] Fed. Rep. of Germany ....... 2556531

[51] Int. Cl.³ ............................................ H02K 21/26
[52] U.S. Cl. .................................. 310/154; 310/83; 310/89; 310/90; 310/239; 310/47; 310/254
[58] Field of Search .............. 310/46, 47, 49, 50, 310/83, 89-91, 154, 239, 254; 49/337, 339; 296/146

[56] References Cited

U.S. PATENT DOCUMENTS

| | | | |
|---|---|---|---|
| 3,361,917 | 1/1968 | Stably | 310/154 |
| 3,445,693 | 5/1969 | Crawshaw et al. | 310/89 X |
| 3,463,951 | 8/1969 | Bauerle et al. | 310/83 X |
| 3,665,228 | 5/1972 | Jacyno | 310/50 X |
| 3,688,138 | 8/1972 | Jacyno et al. | 310/89 X |
| 3,789,251 | 1/1974 | King | 310/239 |
| 4,079,275 | 3/1978 | Fu | 310/89 X |

*Primary Examiner*—Mark O. Budd
*Attorney, Agent, or Firm*—Kenyon & Kenyon

[57] ABSTRACT

A motor drive for a window lifter in motor vehicle doors has an integrated flat housing containing a permanent magnet DC motor and a worm gear driven by a worm on the extended motor shaft; the housing has two halves which are separable in the plane of the motor axis and which serve as the return yoke of the motor.

A single permanent magnet is arranged in the space defined on two sides essentially by the motor rotor on the one hand and the worm gear on the other hand and each of the two housing halves serves as a pole plate.

8 Claims, 5 Drawing Figures

PERMANENT MAGNET MOTOR DRIVEN WINDOW LIFTER

This is a continuation of application Ser. No. 144,572 filed Apr. 28, 1980, which was a continuation of application Ser. No. 964,634, filed Nov. 11, 1978.

BACKGROUND OF THE INVENTION

This invention relates to a motor driven window lifter, especially for installation in doors of motor vehicles, in which an integrated flat housing containing a permanent magnet excited DC motor and a worm gear driven via a worm on the motor shaft is divided into two housing halves which can be parted in the plane of the motor axis and which, at same time, serve as the motor return yoke of the DC motor.

It is an object of the present invention to provide a compact, simple drive, which is insensitive to shock and pressure as well as quiet in operation. It is a further object of the invention to provide a drive which can be used as a "symmetrical drive" in very cramped spaces, independently of the position of any drive mechanism to be coupled thereto. Still another object of the invention is to provide such a drive for use with a window lifter equally advantageously in the right door as well as in the left door of a motor vehicle.

SUMMARY OF THE INVENTION

According to the present invention, the above problems are solved by providing a window lifter in which a permanent magnet is arranged in a space defined on two sides by the motor rotor and the worm gear and by utilizing the two housing halves as pole plates or pieces which are fastened on both sides to a magnetically non-conducting frame. According to the invention, a second permanent magnet which would normally be located on the side of the DC motor facing away from the worm gear is dispensed with, the only permanent magnet used being arranged in the "dead angle" between the worm gear and the motor rotor. A "one-legged" form of the motor driven window lifter is thus obtained, as compared to the "two-legged" form normally used.

By fastening the pole plates to both sides of the non magnetic frame and by holding or supporting the motor parts as well as the gear parts in the pole plates as an integrated part of the housing, fabrication and assembly of the motor and gear parts in the frame is made simple; at the same time, assembly of the pole parts to the frame closes the entire housing, sealing it tightly to the outside while preventing magnetic short circuit of the pole plates at their ends remote from the permanent magnet.

In the interest of keeping a small inventory of parts which can be manufactured and assembled with little effort, half-open bearing sleeves or shells are integrally formed on the frame and the bearings, which are placed in the bearing shells and are axially positioned thereby, are secured against radial motion by a spring clip which can be clamped to the frame over the bearing shell opening.

This advantageous embodiment of a "symmetrical drive" is further improved by shaping the pole plates and the frame into a housing substantially symmetrical to an axis passing through the output shaft of the worm gear and the motor shaft bearing at the opposite end. In this way a motor driven window lifter is provided which can be coupled to the remaining part of the drive mechanism in either the left or the right door of a motor vehicle by a simple rotation about axis of symmetry without need for a mounting space of different size in the height or the depth of the door, such as would be necessary in the case of an L-shaped housing.

DETAILED DESCRIPTION OF THE INVENTION

Figure 1:
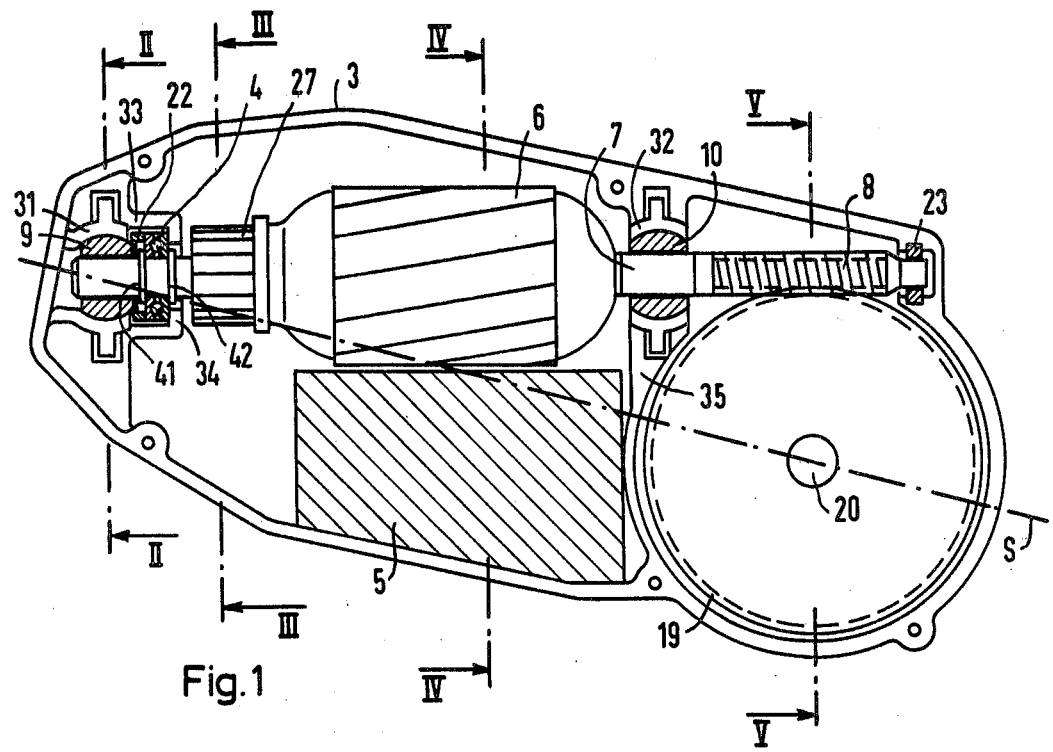
FIG. 1 is a view in longitudinal cross section of a drive housing with the motor and gear parts inserted in accordance with the teachings of the invention.
Figure 4:
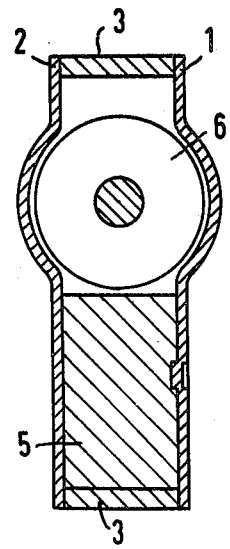
FIG. 4 is a view in cross section of the motor assembly of FIG. 1 taken along section line IV—IV.

Reference is first made to FIG. 1 where it can be seen that the motor rotor 6 and the worm gear 19 are rotatably supported in a magnetically nonconducting, die-cast or injection molded frame 3 of aluminum, zinc or plastic. A single permanent magnet 5 is arranged in the space bounded at the top by the motor rotor 6, as one side, and at the right by the worm gear 19, as another side. In the region of the motor rotor 6, two housing halves 1 and 2, parted along the plane of the motor axis and shaped to serve as pole plates, are mounted on the frame 3, forming a tightly closed essentially flat housing. As can best be seen in FIG. 4, the pole plates 1 and 2 have end portions resting against the permanent magnet 5, while they are fitted in the region of the motor rotor 6 to the curvature of the motor rotor 6 like pole surfaces. They are fastened to the frame 3 at their ends or sides furthest removed from the permanent magnet 5 in such a way that a magnetic short circuit is avoided. The permanent magnet 5 need not be curved to fit the rotor because it is magnetized perpendicular to the direction of the motor axis and does not itself form a pole piece.

Figure 2:
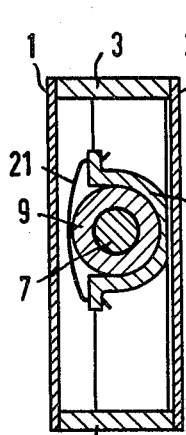
FIG. 2 is a view in cross section of the motor assembly of FIG. 1 taken along the section line II—II.

The motor rotor 6 is supported at its left end adjacent to commutator 27 by means of spherical bearings 9, mounted in half-open bearing shell 31 which is integrally cast with the frame 3. The spherical bearing 9 can be secured therein by a spring clip 21 clamped over the open side of bearing shell 31 (FIG. 2).

The shaft 7 of the motor 6 has a long extension to the right and ends in a worm 8 coupled to the worm gear 19. A second spherical bearing 10 is provided between the worm 8 and the near end face of the motor rotor 6; it is supported, in a manner similar to the spherical bearing 9, in a half-open bearing shell 32 formed on frame 3, and is also secured by a spring clip. Another support bearing 23 is provided, as shown, for the end of shaft 7 where it extends beyond the meeting point with worm gear 19. To take up the axial pressure caused by the worm drive, the left spherical bearing 9 is preceded by a thrust bearing 4, which is held in an enlarged end portion 33 adjacent to bearing receptacle 31; bearing receptacle 33 is also integrally formed on the frame 3, being produced when the frame is die cast or injection molded. The axial pressure is transmitted to the thrust bearing 4 from the shaft 7 of the motor rotor 6 by expanding rings 41 and 42 which are engaged in grooves of shaft 7 and which rest against both sides of the thrust of bearing 4. The thrust of bearing 4 is transmitted in one direction via a support washer extending over expanding ring 41 to the spherical part 9 and in the other direction via the shoulder 34 formed on frame 3 as part of the half-open bearing shell 31. Instead of the bracing against the spherical part 9, another formed shoulder could be provided. Thus, with a very simple assembly, a structure is provided for taking up the axial forces in both directions by a single thrust bearing and the tandem axial arrangement of the spherical bearing 9 for taking up radial forces.

According to another aspect of the invention, a partition is also formed integrally on to the frame 3 for separating the gears 8 and 19 from the motor parts 6 and 5. Advantageously, the pole plates 1 and 2 and the frame together form a largely symmetrical housing 1, 2, 3, relative to an axis of symmetry S which passes through the center of the output shaft 20 of the worm gear 19 and the bearing 9, 31 at the far end of the shaft 7 of motor 6. As may best be seen in FIG. 1, this arrangement provides approximately the same mounting volume above and below the axis of symmetry S. Thus, if a window lifter assembly, produced in accordance with this teaching of the invention, is installed in the right or left door of a motor vehicle, the power can be taken off output shaft 20 to the left or the right by merely turning the motor drive about the axis of symmetry S; a mounting space of different size need not be provided in either one or the other position.

Figure 3:
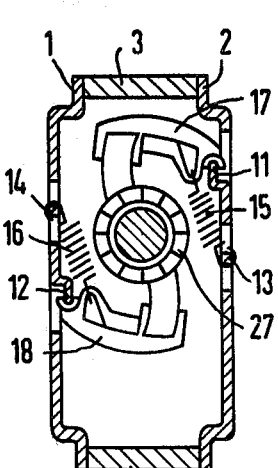
FIG. 3 is a view in cross section of the motor assembly of FIG. 1 taken along section line III—III.

According to an advantageous embodiment of the invention shown in FIG. 3, tabs 11 and 12, integral with pole plates 1 and 2, are punched inward and bent to form hooks on which hammerhead brush holders 17 and 18, respectively, are hung. Brush holders 17 and 18 are pivoted against tabs 11 and 12 on self-contained, mating counter bearings, in the manner of a knife edge, and are urged against the commutator 27 by respective springs 15 and 16. The use of hammerhead brush holders, in addition to very simple manufacture and assembly with their advantageous knife edge support, provides a substantial contribution to the desired noise reduction. Additional tabs 13 and 14 are advantageously bent inward out of the pole plates 1 and 2 and the springs 15 and 16 are hooked thereon at their ends opposite the brush holders 17 and 18.

Figure 5:
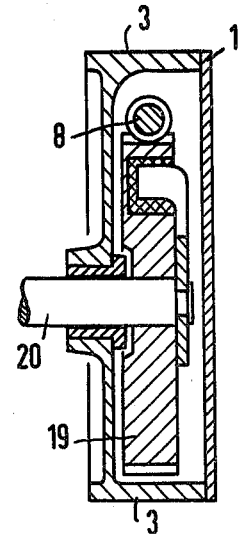
FIG. 5 is a view in cross section of the motor assembly of FIG. 1 taken along the section line V—V.

As is evident, especially from FIG. 5, the pole plate 1 provides lateral cover for the gear part of the frame 3 as well as the motor part and rests conformingly on it. The pole plate 2, on the other hand, covers only the motor part, since the frame is cup shaped in the region of the gear part and includes a central cast-on bearing receptacle for the output shaft 20. The cup so formed need only be closed off and tightly sealed by the pole plate 1 which is put in place after the gear parts are inserted. Both pole plates are connected to the frame 3 firmly and tightly, for instance, by screws. The openings in the pole plates 1, 2 formed by the bent-out tabs 11 to 14 can be sealed when assembly is complete by the external application of adhesive film or of a sealing compound.

The "symmetrical drive" according to the invention, described above for use in a motor driven window lifter, is simple, compact, insensitive to pressure and shock, and produces little noise when operated. It can also be used to provide operating power for opening and closing doors and sliding roofs in motor vehicles.

What is claimed is:

1. A motor drive useful in a window lifter for motor vehicles, having an integrated narrow housing comprising:
   (a) a substantially continuous hollow, non-magnetic frame;
   (b) a permanent magnet DC motor comprising
      (1) a rotor;
      (2) a single permanent magnet; and
      (3) first and second pole plates for conducting flux from said magnet to opposite sides of said rotor, said pole plates in contact with said magnet on opposite sides thereof;
   (c) a worm gear drive comprising:
      (1) a drive shaft extending from said rotor and connected to a worm;
      (2) a worm gear which lies in the plane of the drive shaft engaging said worm;
   (d) said single permanent magnet located adjacent to the rotor on the same side of the shaft as the worm gear and bounded on one side by said rotor on an adjacent side by said worm gear and on the side opposite said rotor by said hollow non-magnetic frame; and
   (e) said pole plates being in the form of covers fastened to said frame on opposite sides of the rotor, magnet and worm gear, said covers and said continuous hollow non-magnetic frame thereby forming the housing for said motor drive.

2. The drive of claim 1, further comprising:
   the shaft being supported in the hollow frame; and
   means for mounting brushes for the DC motor on the covers.

3. A motor drive in accordance with claim 2 having half-open bearing shells formed integrally with the frame for receiving the motor bearings and having a spring clip for clamping to the frame over the bearing opening for securing the bearing against radial motion in the shell.

4. A motor drive in accordance with claim 3 in which a spherical bearing, secured in a half-open bearing shell by a spring clip, and an axially adjacent thrust bearing provide support for the motor rotor shaft distant from the worm gear.

5. A motor drive in accordance with claim 1, having a partition separating the gear parts from the motor parts which is integrally formed with the frame.

6. A motor drive in accordance with claim 5, in which the pole plates and the frame form a substantially symmetrical housing relative to an axis of symmetry passing through the center of the worm gear and the support for the shaft of the motor at the end farthest away from the worm gear output shaft.

7. A motor drive in accordance with claim 6 in which tabs, punched and bent inward on the pole sheets, support hammerhead brush holders having mating counter-bearing surfaces on said tabs in the manner of knife edges, and springs connected to the pole sheets press each brushholder against a tab and against the commutator of the DC motor.

8. A motor drive in accordance with claim 7, in which the springs are connected to the pole plates by means of tabs punched and bent out of the plates.

* * * * *